United States Patent
Zhao

(10) Patent No.: US 12,538,272 B2
(45) Date of Patent: Jan. 27, 2026

(54) METHOD FOR SELECTING RESOURCE, APPARATUS FOR SELECTING RESOURCE, AND STORAGE MEDIUM

(71) Applicant: Beijing Xiaomi Mobile Software Co., Ltd., Beijing (CN)

(72) Inventor: Qun Zhao, Beijing (CN)

(73) Assignee: Beijing Xiaomi Mobile Software Co., Ltd., Beijing (CN)

( * ) Notice: Subject to any disclaimer, the term of this patent is extended or adjusted under 35 U.S.C. 154(b) by 325 days.

(21) Appl. No.: 18/268,485

(22) PCT Filed: Dec. 23, 2020

(86) PCT No.: PCT/CN2020/138702
§ 371 (c)(1),
(2) Date: Jun. 20, 2023

(87) PCT Pub. No.: WO2022/133826
PCT Pub. Date: Jun. 30, 2022

(65) Prior Publication Data
US 2024/0023073 A1    Jan. 18, 2024

(51) Int. Cl.
*H04W 72/02* (2009.01)
*H04W 72/044* (2023.01)

(52) U.S. Cl.
CPC .................... *H04W 72/044* (2013.01)

(58) Field of Classification Search
CPC ... H04W 72/044; H04W 72/25; H04W 92/18; H04W 72/02; H04W 4/40; H04W 4/70; H04W 72/0446; H04W 72/0453; H04W 72/23; H04W 72/542
See application file for complete search history.

(56) References Cited

U.S. PATENT DOCUMENTS

| | | | |
|---|---|---|---|
| 2017/0006586 A1 | 1/2017 | Gulati et al. | |
| 2017/0041902 A1* | 2/2017 | Sheng | H04W 72/02 |
| 2018/0092065 A1* | 3/2018 | Sheng | H04W 74/006 |

(Continued)

FOREIGN PATENT DOCUMENTS

| | | | |
|---|---|---|---|
| CN | 111246483 A | 6/2020 | |
| CN | 111865483 A | 10/2020 | |

(Continued)

OTHER PUBLICATIONS

LG Electronics,"Discussion on feasibility and benefits for mode 2 enhancement",3GPP TSG RAN WG1 Meeting #103-e, R1-2007896,e-Meeting, Oct. 26-Nov. 13, 2020.

(Continued)

*Primary Examiner* — Cheikh T Ndiaye
(74) *Attorney, Agent, or Firm* — Volpe Koenig

(57) ABSTRACT

A resource selection method, includes: receiving first direct connection control signaling sent by a second device by using a first direct connection resource pool, the first direct connection control signaling comprising an indication of an auxiliary time-frequency resource set, and the auxiliary time-frequency resource set belonging to a second direct connection resource pool and being used for assisting a first device in resource selection; and selecting a direct connection transmission resource in a third direct connection resource pool on the basis of the auxiliary time-frequency resource set.

20 Claims, 7 Drawing Sheets

(56) References Cited

U.S. PATENT DOCUMENTS

| | | |
|---|---|---|
| 2019/0246385 A1 | 8/2019 | Lin et al. |
| 2020/0187207 A1 | 6/2020 | Kang et al. |
| 2023/0254816 A1* | 8/2023 | Dutta .................... H04L 5/0053 370/329 |

FOREIGN PATENT DOCUMENTS

| | | | | |
|---|---|---|---|---|
| EP | 3487238 A1 * | 5/2019 | ............ | H04W 72/02 |
| WO | 2018/201414 A1 | 11/2018 | | |
| WO | 2020/192244 A1 | 10/2020 | | |

OTHER PUBLICATIONS

Chinese Search Report issued on Jun. 20, 2022 for Chinese Patent Application No. 2020800042332.
International Search Report issued on Sep. 8, 2021 for PCT Patent Application No. PCT/CN2020/138702.

\* cited by examiner

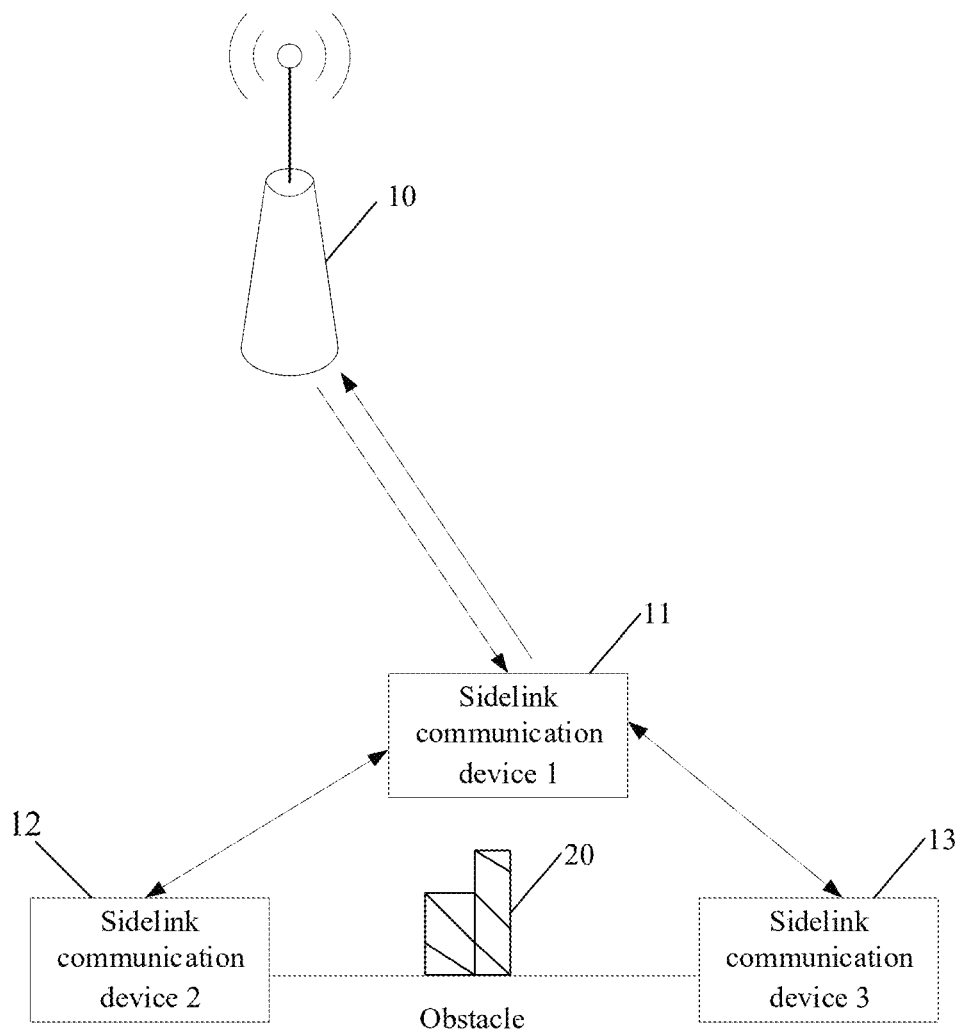

METHOD FOR SELECTING RESOURCE, APPARATUS FOR SELECTING RESOURCE, AND STORAGE MEDIUM

CROSS REFERENCE TO RELATED APPLICATIONS

The present application is a U.S. National Stage of International Application No. PCT/CN2020/138702, filed on Dec. 23, 2020, the contents of all of which are incorporated herein by reference in their entirety for all purposes.

BACKGROUND

Surging new-generation Internet applications require a higher-level radio communication technology, thus promoting continuous evolution of the radio communication technology to satisfy demands of the applications.

With the development of a new-generation 5th generation (5G) mobile communication technology, the 3rd generation partnership project release-16 (3GPP Rel-16) provides support for sidelink communication services and scenarios by using a 5G new radio (NR) technology. For instance, it provides support for new vehicle-to-everything (V2X) communication services and scenarios.

SUMMARY

The disclosure relates to the technical field of communication, and particularly relates to a method for selecting a resource, an apparatus for selecting a resource, and a storage medium.

A first aspect of an example of the disclosure provides a method for selecting a resource. The method for selecting a resource is performed by a first device and includes: receiving first sidelink control signaling transmitted from a second device by using a first sidelink resource pool, where the first sidelink control signaling includes an indication of an auxiliary time and frequency resource set, and the auxiliary time and frequency resource set belongs to a second sidelink resource pool and is configured to assist the first device in selecting a resource; and selecting a sidelink transmission resource from a third sidelink resource pool based on the auxiliary time and frequency resource set; where the first device is configured or pre-configured with a plurality of sidelink resource pools, and the third sidelink resource pool is one or more sidelink resource pools in the plurality of sidelink resource pools.

A second aspect of an example of the disclosure provides a method for selecting a resource. The method for selecting a resource is performed by a second device and includes: determining the second device is configured or pre-configured with a plurality of sidelink resource pools, determining a first sidelink resource pool from the plurality of sidelink resource pools; and transmitting first sidelink control signaling by using the first sidelink resource pool, where the first sidelink control signaling includes an indication of an auxiliary time and frequency resource set, and the auxiliary time and frequency resource set belongs to a second sidelink resource pool and is configured to assist a first device in selecting a resource.

A third aspect of an example of the disclosure provides an apparatus for selecting a resource. The apparatus for selecting a resource includes:
a processor, and a memory configured to store processor-executable instructions;
where the processor-executable instructions, when executed by the processor, cause the processor to:
receive first sidelink control signaling transmitted from a second device by using a first sidelink resource pool, where the first sidelink control signaling includes an indication of an auxiliary time and frequency resource set, and the auxiliary time and frequency resource set belongs to a second sidelink resource pool and is configured to assist the first device in selecting a resource; and select a sidelink transmission resource from a third sidelink resource pool based on the auxiliary time and frequency resource set; where the first device is configured or pre-configured with a plurality of sidelink resource pools, and the third sidelink resource pool is one or more sidelink resource pools in the plurality of sidelink resource pools.

A fourth aspect of an example of the disclosure provides an apparatus for selecting a resource. The apparatus for selecting a resource includes:
a processor, and a memory configured to store processor-executable instructions,
where the processor-executable instructions, when executed by the processor, cause the processor to:
determine the second device is configured or pre-configured with a plurality of sidelink resource pools, determine a first sidelink resource pool from the plurality of sidelink resource pools; and transmit first sidelink control signaling by using the first sidelink resource pool, where the first sidelink control signaling includes an indication of an auxiliary time and frequency resource set, and the auxiliary time and frequency resource set belongs to a second sidelink resource pool and is configured to assist a first device in selecting a resource.

A fifth aspect of an example of the disclosure provides a non-transitory computer-readable storage medium. When an instruction in the storage medium is executed by a processor of a mobile terminal, the mobile terminal is capable of performing the method for selecting a resource according to the first aspect.

A sixth aspect of an example of the disclosure provides a non-transitory computer-readable storage medium. When an instruction in the storage medium is executed by a processor of a mobile terminal, the mobile terminal is capable of performing the method for selecting a resource according to the second aspect.

It is to be understood that the above general description and the following detailed description are merely illustrative and explanatory, and cannot limit the disclosure.

BRIEF DESCRIPTION OF THE DRAWINGS

The accompanying drawings herein are incorporated in the description as a constituent part of the description, illustrate examples conforming to the disclosure, and serve to describe principles of the disclosure together with the description.

FIG. 1 is a schematic diagram of a sidelink communication system according to an illustrative example;

FIG. 2 is a flow diagram of a method for selecting a resource according to an illustrative example;

DETAILED DESCRIPTION

Figure 3:
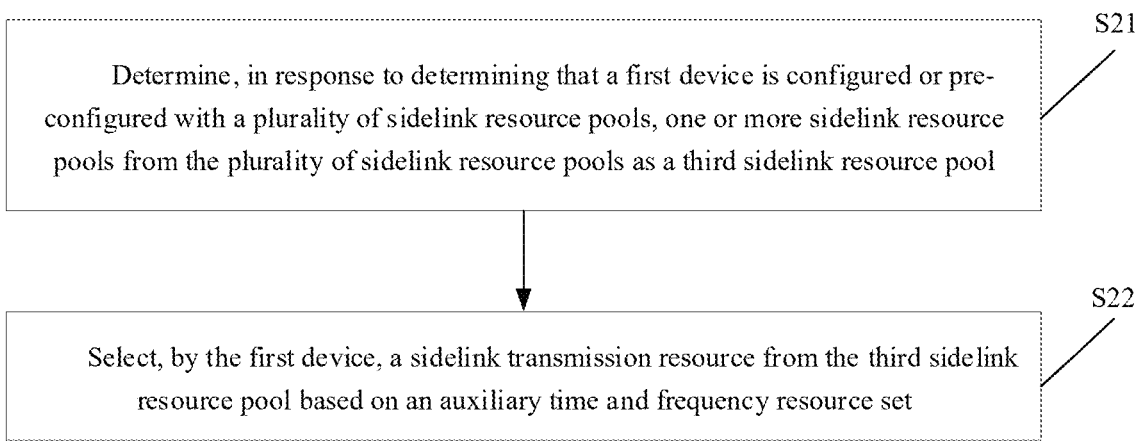
FIG. 3 is a flow diagram of another method for selecting a resource according to an illustrative example.

Illustrative examples will be described in detail herein and shown in the accompanying drawings illustratively. When the following descriptions involve the accompanying drawings, unless otherwise specified, the same numeral in different accompanying drawings denotes the same or similar elements. The embodiments described in the following illustrative examples do not denote all embodiments consistent with the disclosure. On the contrary, the embodiments are merely instances of an apparatus and a method consistent with some aspects of the disclosure as detailed in the appended claims.

In the related art, a sidelink communication resource pool includes time and frequency resources used by user equipment for sidelink communication. It is divided into a transmission (Tx) resource pool and a reception (Rx) resource pool. The user equipment senses a channel, selects a resource from the Tx resource pool, and performs physical sidelink control channel (PSCCH) blind detection and data reception in the Rx resource pool. In the related art, user equipment A with sidelink communication can transmit a resource set to user equipment B with a resource selection mode of Mode2, and the user equipment B will take it into consideration when selecting resources for its own data transmission. User equipments need to coordinate resources with each other. However, in Rel-16 V2X, a user equipment can be configured with a plurality of different Tx resource pools and/or Rx resource pools. When the user equipment is configured or pre-configured with a plurality of Tx resource pools, how to perform effective inter-user coordination is a technical problem to be solved.

In order to solve problems in the related art, the disclosure provides a method for selecting a resource, an apparatus for selecting a resource, and a storage medium.

A method for selecting a resource according to an example of the disclosure may be applied to a sidelink communication system as shown in FIG. 1. With reference to FIG. 1, in a scenario of sidelink communication between sidelink communication devices, a network device 10 configures various transmission parameters for data transmission for a sidelink communication device 1, and sidelink communication device 1 is marked as 11 in FIG. 1. The sidelink communication device 1, a sidelink communication device 2 and a sidelink communication device 3 perform sidelink communication, where sidelink communication device 2 is marked as 12 in FIG. 1, and sidelink communication device 3 is marked as 13 in FIG. 1. An obstacle 20 may exist between the sidelink communication device 2 and the sidelink communication device 3. A link for communication between the network device and the sidelink communication device is an uplink or a downlink, and a link between the sidelink communication device and the sidelink communication device is a sidelink.

In the disclosure, the scenario of sidelink communication between the sidelink communication devices may be a vehicle-to-everything (V2X) service scenario. V represents a vehicular device, and X represents any object interacting with the vehicular device. At present, X may include a vehicular device, a handheld device, a roadside transportation infrastructure, and a network. Information modes of V2X interaction include: vehicle-to-vehicle (V2V), vehicle-to-infrastructure (V2I), vehicle-to-pedestrian (V2P), and vehicle-to-network (V2N).

The Internet of vehicles may effectively improve traffic safety, improve traffic efficiency, and enrich the travel experience for people. Communication of the Internet of vehicles is supported by using an existing cellular communication technology, such that existing base station deployment may be effectively used, and device overhead may be reduced. Further, quality of service (QoS) guaranteed services may be provided to satisfy the requirements of services of the Internet of vehicles. Therefore, long-term evolution (LTE) release (Rel)-14/15 provides cellular network support for V2X communication of the Internet of vehicles, that is, cellular vehicle-to-everything (C-V2X). In the C-V2X, the vehicular device may be in communication with other devices via a base station and a core network; that is, communication is performed via an uplink or a downlink between a terminal and the base station in an original cellular network, and alternatively, communication may be performed directly via a sidelink between devices. Compared with user-to-user (Uu) interface communication, sidelink communication has characteristics of a short delay and low overhead, which is very suitable for sidelink communication between the vehicular device and other peripheral devices having a close geographic position to the vehicular device.

The scenario of sidelink communication between the sidelink communication devices may be a device-to-device (D2D) communication scenario. In an example of the disclosure, the sidelink communication devices for sidelink communication may include various devices having a radio communication function such as a handheld device, a vehicular device, a wearable device, a computing device, or other processing devices connected to a radio modem, and various forms of user equipment (UE), a mobile station (MS), a terminal, terminal equipment, etc. For convenience of description, the example of the disclosure will be described below by taking a sidelink communication device as user equipment.

With the development of a new-generation 5th generation (5G) mobile communication technology, the 3rd generation partnership project release-16 (3GPP Rel-16) provides, by using a 5G new radio (NR) technology, support for new V2X communication services and scenarios, such as vehicles platooning, extended sensors, advanced driving, and remote driving. Generally, the 5G V2X sidelink may provide a higher communication rate, a shorter communication delay, and a more reliable communication quality.

In the R16 NR sidelink, it is assumed that all sidelink user equipments use the same bandwidth part (BWP), and define a resource pool on the BWP. A sidelink communication resource pool includes time and frequency resources used by a user equipment for sidelink communication, and is divided into a transmission resource pool (Tx resource pool) and a reception resource pool (Rx resource pool). The user equipment senses a channel and selects a resource in the Tx resource pool, and performs the physical sidelink control channel (PSCCH) blind detection and the data reception in the Rx resource pool. In the Rel-16 V2X, user equipment may be configured with a plurality of different Tx resource pools and/or Rx resource pools.

Based on the technology of the Rel-16 V2X, the Rel-17 sidelink may continue to discuss how to further reduce delays and enhance the reliability of sidelink communication through inter-user coordination. Rel-17 NR is discussing how to improve the reliability of Mode 2 resource selection or reduce delays through cooperation between users. A proposed method is that user equipment A transmits a resource set to user equipment B, and the user equipment B considers the resource set transmitted from the user equipment A when selecting a resource. For instance, the user equipment A may determine which resources are suitable for sidelink communication of the user equipment B or not according to a channel sensing result, and indicate the resources to the user equipment B. The user equipment B selects a resource by combining its own channel sensing result and a channel sensing result of the user equipment A, such that the reliability of resource selection may be improved.

However, the above solution for resource coordination via inter-user cooperation is based on the assumption that both the user equipment A and the user equipment B are each configured with a Tx resource pool. When the user equipment A and/or the user equipment B are configured with more than one resource pool, how to effectively coordinate resources between the user equipment A and the user equipment B is not discussed.

An example of the disclosure provides a method for selecting a resource. In the method for selecting a resource, in response to determining that user equipment is configured with a plurality of sidelink resource pools (more than one sidelink resource pool), resources are coordinated between user equipments based on the plurality of sidelink resource pools.

In the example of the disclosure, devices performing sidelink communication are referred to as a first device and a second device for the convenience of description. The first device may be user equipment selecting a resource based on an auxiliary time and frequency resource transmitted from the second device, and for instance, may be the user equipment B in the above instance. It may be understood that the second device is user equipment providing the auxiliary time and frequency resource, and for instance, is the user equipment A in the above instance. The first device may be configured with a plurality of sidelink resource pools; and/or, the second device may be configured with a plurality of sidelink resource pools.

It may be understood that the plurality of sidelink resource pools configured for the first device and/or the second device may be Tx resource pools or Rx resource pools. The plurality of sidelink resource pools may be resource pools configured on the same BWP or carrier frequency, or resource pools configured on different BWPs or carrier frequencies.

Further, in the example of the disclosure, control signaling transmitted from the second device and configured to indicate an auxiliary time and frequency resource set considered when assisting the first device in selecting a resource is referred to as first sidelink control signaling. The first sidelink control signaling may be physical layer sidelink control signaling, media access control (MAC) layer sidelink control signaling, or radio resource control (RRC) layer sidelink control signaling.

Further, in the example of the disclosure, a resource pool where the second device transmits the first sidelink control signaling is referred to as a first sidelink resource pool. A sidelink resource pool to which the auxiliary time and frequency resource set assisting the first device in selecting the resource belongs is referred to as a second sidelink resource pool. A sidelink resource pool where the second device selects a sidelink transmission resource is referred to as a third sidelink resource pool.

FIG. 2 is a flow diagram of a method for selecting a resource according to an illustrative example. As shown in FIG. 2, the method for selecting a resource is applied to a first device and includes steps as follows.

In S11, first sidelink control signaling transmitted from a second device by using a first sidelink resource pool is received.

The first sidelink control signaling includes an indication of an auxiliary time and frequency resource set. The auxiliary time and frequency resource set belongs to a second sidelink resource pool and is configured to assist the first device in selecting a resource.

In S12, a sidelink transmission resource is selected from a third sidelink resource pool based on the auxiliary time and frequency resource set.

In the example of the disclosure, when a plurality of sidelink resource pools are configured between devices and the devices coordinate resources with each other, the second device transmits the first sidelink control signaling by using the first sidelink resource pool. The first sidelink control signaling includes the indication of the auxiliary time and frequency resource set, and the auxiliary time and frequency resource set belongs to the second sidelink resource pool and is configured to assist the first device in selecting the resource. The first device receives the first sidelink control signaling transmitted from the second device by using the first sidelink resource pool, and selects the sidelink transmission resource from the third sidelink resource pool based on the auxiliary time and frequency resource set.

The first sidelink resource pool, the second sidelink resource pool, and the third sidelink resource pool may be the same sidelink resource pool or not.

In the method for selecting a resource according to the example of the disclosure, the first device may be configured or pre-configured with a plurality of sidelink resource pools. The third sidelink resource pool may be one or more sidelink resource pools in the plurality of sidelink resource pools configured for the first device.

The technical solutions provided by the examples of the disclosure can have the following beneficial effects: the second device transmits the first sidelink control signaling by using the first sidelink resource pool, where the first sidelink control signaling includes the indication of the auxiliary time and frequency resource set, and the auxiliary time and frequency resource set belongs to the second sidelink resource pool and is configured to assist the first device in selecting the resource; and the first device receives the first sidelink control signaling transmitted from the second device by using the first sidelink resource pool, and selects the sidelink transmission resource from the third sidelink resource pool based on the auxiliary time and frequency resource set. According to the disclosure, devices can coordinate resources with each other when the plurality of sidelink resource pools are configured between the devices.

FIG. 3 is a flow diagram of a method for selecting a resource according to an illustrative example. As shown in FIG. 3, the method for selecting a resource is applied to a first device and includes steps as follows.

In S21, in response to determining that the first device is configured or pre-configured with a plurality of sidelink resource pools, one or more sidelink resource pools are determined from the plurality of sidelink resource pools as a third sidelink resource pool.

In the example of the disclosure, the first device may be configured or pre-configured with a plurality of Tx resource pools or a plurality of Rx resource pools.

The plurality of sidelink resource pools configured or pre-configured for the first device may be resource pools configured on the same BWP or carrier frequency, or resource pools configured on different BWPs or carrier frequencies.

In S22, the first device selects a sidelink transmission resource from the third sidelink resource pool based on an auxiliary time and frequency resource set.

In the example of the disclosure, the auxiliary time and frequency resource set belongs to a second sidelink resource pool and is configured to assist the first device in selecting a resource. In an embodiment, the second sidelink resource pool may be determined based on the third sidelink resource pool.

In an embodiment, the second sidelink resource pool may be the same sidelink resource pool as the third sidelink resource pool.

The auxiliary time and frequency resource set provided by the example of the disclosure may be indicated by first sidelink control signaling transmitted from a second device. The second device may transmit the first sidelink control signaling by using a first sidelink resource pool. In an embodiment, the first sidelink resource pool may be determined based on the third sidelink resource pool.

In an instance, the first sidelink resource pool may be the same sidelink resource pool as the third sidelink resource pool.

In the method for selecting a resource according to the example of the disclosure, under the condition of satisfying a triggering condition, the second device is triggered to transmit the first sidelink control signaling.

On one hand, in the method for selecting a resource according to the example of the disclosure, the first device may transmit sidelink control signaling configured to trigger the second device to transmit the first sidelink control signaling to the second device, which is referred to as second sidelink control signaling below. On the other hand, transmission of the first sidelink control signaling is triggered by sensing a sidelink channel or measuring a sidelink channel/signal.

In the method for selecting a resource according to the example of the disclosure, the third sidelink resource pool includes a time and frequency resource triggering the second device to transmit the first sidelink control signaling. The time and frequency resource triggering the second device to transmit the first sidelink control signaling includes one or a combination of the following: a time and frequency resource used by the second sidelink control signaling transmitted from the first device; a time and frequency resource used by a sidelink channel sensed or measured by the first device; and a time and frequency resource used by a sidelink signal sensed or measured by the first device. That is, the sidelink channel or the sidelink signal sensed or measured belongs to the third resource pool; and/or, a time and frequency resource used for transmission of the second sidelink control signaling belongs to the third resource pool.

Figure 4:
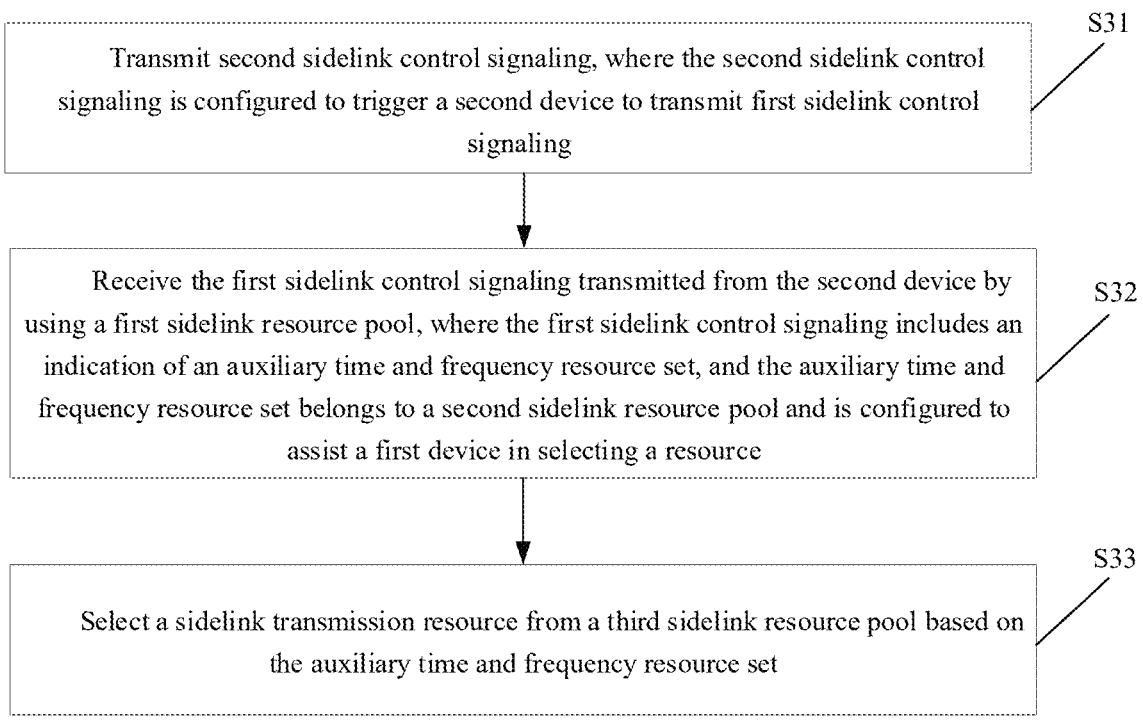
FIG. 4 is a flow diagram of yet another method for selecting a resource according to an illustrative example.

FIG. 4 is a flow diagram of a method for selecting a resource according to an illustrative example. As shown in FIG. 4, the method for selecting a resource is applied to a first device and includes steps as follows.

In S31, second sidelink control signaling is transmitted, where the second sidelink control signaling is configured to trigger a second device to transmit first sidelink control signaling.

In an embodiment, the second sidelink control signaling carries a second indication of a first sidelink resource pool and/or a second sidelink resource pool. In another embodiment, the second sidelink control signaling carries a third indication of a third sidelink resource pool.

In S32, the first sidelink control signaling transmitted from the second device by using the first sidelink resource pool is received.

The first sidelink control signaling includes an indication of an auxiliary time and frequency resource set. The auxiliary time and frequency resource set belongs to the second sidelink resource pool and is configured to assist the first device in selecting a resource.

In S33, a sidelink transmission resource is selected from the third sidelink resource pool based on the auxiliary time and frequency resource set.

It may be understood that, in the example of the disclosure, in response to determining that the second device is configured with a plurality of sidelink resource pools, the second device determines a time and frequency resource used by the second sidelink control signaling from the plurality of sidelink resource pools. A sidelink resource pool to which the time and frequency resource used by the second sidelink control signaling belongs is referred to as a fourth sidelink resource pool below.

Figure 5:
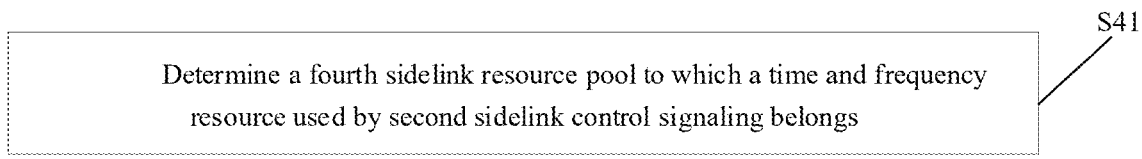
FIG. 5 is a flow diagram of yet another method for selecting a resource according to an illustrative example.

FIG. 5 is a flow diagram of a method for selecting a resource according to an illustrative example. As shown in FIG. 5, the method for selecting a resource is applied to a first device and includes steps as follows.

In S41, a fourth sidelink resource pool to which a time and frequency resource used by the second sidelink control signaling belongs is determined.

In an embodiment, in the example of the disclosure, the fourth sidelink resource pool may be determined according to configuration information. In an instance, the first device may obtain the configuration information by receiving base station downlink signaling or pre-configuration.

In another embodiment, the fourth sidelink resource pool is determined based on a set rule. In an instance, the fourth sidelink resource pool is determined according to a configuration order of sidelink resource pools, and alternatively, is randomly selected from a plurality of sidelink resource pools, and alternatively, is determined according to priority information of data to be transmitted.

In yet another embodiment, the fourth sidelink resource pool is determined based on a channel sensing or signal measurement result. In an instance, selection is performed according to a measurement value of a channel busy ratio (CBR). For instance, a sidelink resource pool having a minimum CBR measurement value or a CBR measurement value smaller than a certain threshold (that is, a congestion situation is not serious) is selected as the fourth sidelink resource pool.

In still another embodiment, the fourth sidelink resource pool is determined based on a third sidelink resource pool.

In the example of the disclosure, the first device determines the fourth sidelink resource pool, and may transmit the second sidelink control signaling by using a time and frequency resource in the fourth sidelink resource pool. The second sidelink control signaling is configured to trigger the second device to transmit the first sidelink control signaling.

In an embodiment, the second sidelink control signaling carries a second indication of a first sidelink resource pool and/or a second sidelink resource pool. In another embodiment, the second sidelink control signaling carries a third indication of the third sidelink resource pool.

The first device receives the first sidelink control signaling transmitted from the second device by using the first sidelink resource pool. The first sidelink control signaling includes an indication of an auxiliary time and frequency resource set. The auxiliary time and frequency resource set belongs to the second sidelink resource pool and is configured to assist the first device in selecting a resource. The first device selects a sidelink transmission resource from the third sidelink resource pool based on the auxiliary time and frequency resource set.

In the method for selecting a resource according to the example of the disclosure, under the condition that the first device is configured with a plurality of sidelink resource pools, on the one hand, the first device may coordinate resources between several pieces of user equipment based on an independent sidelink resource pool. On the other hand, the first device may coordinate resources between a plurality of sidelink resource pools across the sidelink resource pools based on the sidelink resource pools.

In the example of the disclosure, under the condition that the resources are coordinated between devices based on the independent sidelink resource pool, the first device determines whether a sidelink resource pool supports selection of the sidelink transmission resource based on the auxiliary time and frequency resource set according to configuration or pre-configuration information.

In the example of the disclosure, the first device may determine whether each of the plurality of sidelink resource pools configured or pre-configured supports selection of the resources based on inter-user coordination by configuring or pre-configuring the base station downlink signaling.

In the example of the disclosure, the first device performs resource inter-user coordination on each sidelink resource pool supporting selection of the resources through inter-user coordination in a plurality of different sidelink resource pools.

In the example of the disclosure, the third sidelink resource pool used for resource selection by the first device is a sidelink resource pool supporting selection of the sidelink transmission resource based on the auxiliary time and frequency resource set. The third sidelink resource pool is one or more sidelink resource pools in the plurality of sidelink resource pools.

In the example of the disclosure, the first sidelink resource pool and/or the second sidelink resource pool are/is determined based on the third sidelink resource pool.

In an instance, the first sidelink resource pool and/or the third sidelink resource pool are/is the same sidelink resource pool as the third sidelink resource pool.

In an instance, the third sidelink resource pool includes a time and frequency resource triggering the second device to transmit the first sidelink control signaling.

In the example of the disclosure, the first device is configured or pre-configured with the plurality of sidelink resource pools, and the first sidelink resource pool used by the second device to transmit the first sidelink control signaling is one or more sidelink resource pools in the plurality of sidelink resource pools.

The first sidelink resource pool is determined by using one or a combination of the following modes:

Mode one: the first sidelink resource pool is determined based on configuration information. The configuration information is obtained by receiving base station downlink signaling or through pre-configuration.

Mode two: the first sidelink resource pool is determined based on a set rule. In an instance, the first sidelink resource pool is determined according to a configuration order of a plurality of sidelink resource pools, and alternatively, is randomly selected from a plurality of sidelink resource pools, and alternatively, is determined according to priority information of data to be transmitted.

Mode three: the first sidelink resource pool is determined based on a channel sensing or signal measurement result. In an instance, a sidelink resource pool or a resource pool set is selected as the first sidelink resource pool according to the channel sensing or channel/signal measurement result. For instance, selection is performed according to a measurement value of a CBR. For instance, a sidelink resource pool having a minimum CBR measurement value or a CBR measurement value smaller than a certain threshold (that is, a congestion situation is not serious) is selected as the first sidelink resource pool.

Mode four: the first sidelink resource pool is determined based on a time and frequency resource triggering the second device to transmit the first sidelink control signaling. In an instance, if transmission of the first sidelink control signaling is activated by receiving the second sidelink control signaling transmitted from the first device, the second sidelink control signaling includes an indication of a sidelink resource pool or a resource pool set used by the second device to transmit the first sidelink control signaling, and the second device determines the first sidelink resource pool according to the indication, where the first sidelink resource pool may be a sidelink resource pool set. In another instance, if transmission of the first sidelink control signaling is triggered by sensing a sidelink channel or measuring a sidelink channel/signal, the second device determines the first sidelink resource pool to which resources used for transmission of the first sidelink control signaling belong according to the sidelink resource pool to which the sensed or measured sidelink channel or sidelink signal triggering the transmission of the sidelink control signaling belongs, where the first sidelink resource pool may be a sidelink resource pool set.

In the example of the disclosure, the first device is configured or pre-configured with a plurality of sidelink resource pools, and the second sidelink resource pool is one or more sidelink resource pools in the plurality of sidelink resource pools.

The second sidelink resource pool is determined by using one or a combination of the following modes:

Mode one: the second sidelink resource pool is determined based on configuration information. The configuration information is obtained by receiving base station downlink signaling or through pre-configuration. In an instance, the second device determines a second resource pool to which the auxiliary time and frequency resource set belongs according to a sidelink resource pool configured or pre-configured. The second resource pool may be a resource pool set.

Mode two: the second sidelink resource pool is determined according to a first indication in the first sidelink control signaling. In an instance, transmission of the first sidelink control signaling is activated by receiving the second sidelink control signaling transmitted from the first device, the second sidelink control signaling includes an indication of a resource pool or a resource pool set used by the first device to select a resource, and the first device determines a resource pool or a resource pool set to which the auxiliary time and frequency resource set belongs according to the indication, and determines the second sidelink resource pool.

Mode three: the second sidelink resource pool is determined according to a time and frequency resource used for transmission of the first sidelink control signaling. In an instance, a resource pool or a resource pool set is selected as the second sidelink resource pool according to the channel sensing or channel/signal measurement result. For instance, selection is performed according to a measurement value of a CBR. For instance, a sidelink resource pool having a minimum CBR measurement value or a CBR measurement value smaller than a certain threshold (that is, a congestion situation is not serious) is selected as the second sidelink resource pool.

Mode four: the second sidelink resource pool is determined according to a channel sensing or signal measurement result. In an instance, transmission of the first sidelink control signaling is triggered by sensing a sidelink channel or measuring a sidelink channel/signal, and the first device determines a resource pool or a resource pool set to which the auxiliary time and frequency resource set belongs as the second sidelink resource pool according to a sidelink resource pool to which the sensed or measured sidelink channel or sidelink signal triggering the transmission of the first sidelink control signaling belongs.

Mode five: the second sidelink resource pool is determined based on a time and frequency resource triggering the second device to transmit the first sidelink control signaling. In an instance, the second device determines the second sidelink resource pool to which the auxiliary time and frequency resource set belongs according to the first sidelink resource pool to which transmission of the first sidelink control signaling belongs. For instance, in a multi-carrier system, a resource pool (set) on the same carrier as the first sidelink resource pool to which the transmission of the first sidelink control signaling belongs is selected as the second sidelink resource pool.

Figure 6:
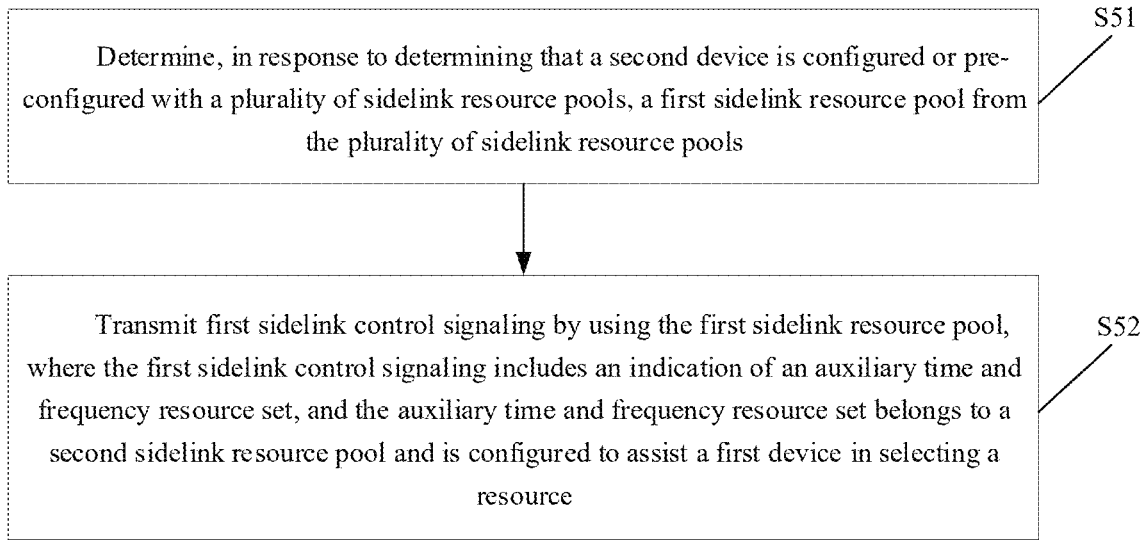
FIG. 6 is a flow diagram of yet another method for selecting a resource according to an illustrative example.

FIG. 6 is a flow diagram of a method for selecting a resource according to an illustrative example. As shown in FIG. 6, the method for selecting a resource is applied to a second device and includes steps as follows.

In S51, in response to determining that the second device is configured or pre-configured with a plurality of sidelink resource pools, a first sidelink resource pool is determined from the plurality of sidelink resource pools.

In the example of the disclosure, the second device may be configured or pre-configured with a plurality of Tx resource pools or a plurality of Rx resource pools.

The plurality of sidelink resource pools configured or pre-configured for the second device may be resource pools configured on the same BWP or carrier frequency, or resource pools configured on different BWPs or carrier frequencies.

In S52, first sidelink control signaling is transmitted by using the first sidelink resource pool. The first sidelink control signaling includes an indication of an auxiliary time and frequency resource set, and the auxiliary time and frequency resource set belongs to a second sidelink resource pool and is configured to assist a first device in selecting a resource.

In the example of the disclosure, the first sidelink resource pool used by the second device to transmit the first sidelink control signaling is one or more sidelink resource pools in the plurality of sidelink resource pools.

The first sidelink resource pool is determined by using one or a combination of the following modes:

Mode one: the first sidelink resource pool is determined based on configuration information. The configuration information is obtained by receiving base station downlink signaling or pre-configuration.

Mode two: the first sidelink resource pool is determined based on a set rule. In an instance, the first sidelink resource pool is determined according to a configuration order of a plurality of sidelink resource pools, and alternatively, is randomly selected from a plurality of sidelink resource pools, and alternatively, is determined according to priority information of data to be transmitted.

Mode three: the first sidelink resource pool is determined based on a channel sensing or signal measurement result. In an instance, a sidelink resource pool or a resource pool set is selected as the first sidelink resource pool according to the channel sensing or channel/signal measurement result. For instance, selection is performed according to a measurement value of a CBR. For instance, a sidelink resource pool having a minimum CBR measurement value or a CBR measurement value smaller than a certain threshold (that is, a congestion situation is not serious) is selected as the first sidelink resource pool.

Mode four: the first sidelink resource pool is determined based on a time and frequency resource triggering the second device to transmit the first sidelink control signaling. In an instance, if transmission of the first sidelink control signaling is activated by receiving the second sidelink control signaling transmitted from the first device, the second sidelink control signaling includes an indication of a sidelink resource pool or a resource pool set used by the second device to transmit the first sidelink control signaling, and the second device determines the first sidelink resource pool according to the indication, where the first sidelink resource pool may be a sidelink resource pool set. In another instance, if transmission of the first sidelink control signaling is triggered by sensing a sidelink channel or measuring a sidelink channel/signal, the second device determines the first sidelink resource pool to which resources used for transmission of the first sidelink control signaling belong according to the sidelink resource pool to which the sensed or measured sidelink channel or sidelink signal triggering the transmission of the sidelink control signaling belongs, where the first sidelink resource pool may be a sidelink resource pool set.

In the example of the disclosure, the second sidelink resource pool is one or more sidelink resource pools in the plurality of sidelink resource pools.

The second sidelink resource pool is determined by using one or a combination of the following modes:

Mode one: the second sidelink resource pool is determined based on configuration information. The configuration information is obtained by receiving base station downlink signaling or pre-configuration. In an instance, the second device determines a second resource pool to which the auxiliary time and frequency resource set belongs according to a sidelink resource pool configured or pre-configured. The second resource pool may be a resource pool set.

Mode two: the second sidelink resource pool is determined according to a first indication in the first sidelink control signaling. In an instance, transmission of the first sidelink control signaling is activated by receiving the second sidelink control signaling transmitted from the first device, the second sidelink control signaling includes an indication of a resource pool or a resource pool set used by the first device to select a resource, and the first device determines a resource pool or a resource pool set to which the auxiliary time and frequency resource set belongs according to the indication, and determines the second sidelink resource pool.

Mode three: the second sidelink resource pool is determined according to a time and frequency resource used for transmission of the first sidelink control signaling. In an instance, a resource pool or a resource pool set is selected as the second sidelink resource pool according to the channel sensing or channel/signal measurement result. For instance, selection is performed according to a measurement value of a CBR. For instance, a sidelink resource pool having a minimum CBR measurement value or a CBR measurement value smaller than a certain threshold (that is, a congestion situation is not serious) is selected as the second sidelink resource pool.

Mode four: the second sidelink resource pool is determined according to a channel sensing or signal measurement result. In an instance, transmission of the first sidelink control signaling is triggered by sensing a sidelink channel or measuring a sidelink channel/signal, and the first device determines a resource pool or a resource pool set to which the auxiliary time and frequency resource set belongs as the second sidelink resource pool according to a sidelink resource pool to which the sensed or measured sidelink channel or sidelink signal triggering the transmission of the first sidelink control signaling belongs.

Mode five: the second sidelink resource pool is determined based on a time and frequency resource triggering the second device to transmit the first sidelink control signaling. In an instance, the second device determines the second sidelink resource pool to which the auxiliary time and frequency resource set belongs according to the first sidelink resource pool to which transmission of the first sidelink control signaling belongs. For instance, in a multi-carrier system, a resource pool (set) on the same carrier as the first sidelink resource pool to which the transmission of the first sidelink control signaling belongs is selected as the second sidelink resource pool.

In an embodiment, the first sidelink control signaling carries a first indication of the second sidelink resource pool.

Figure 7:
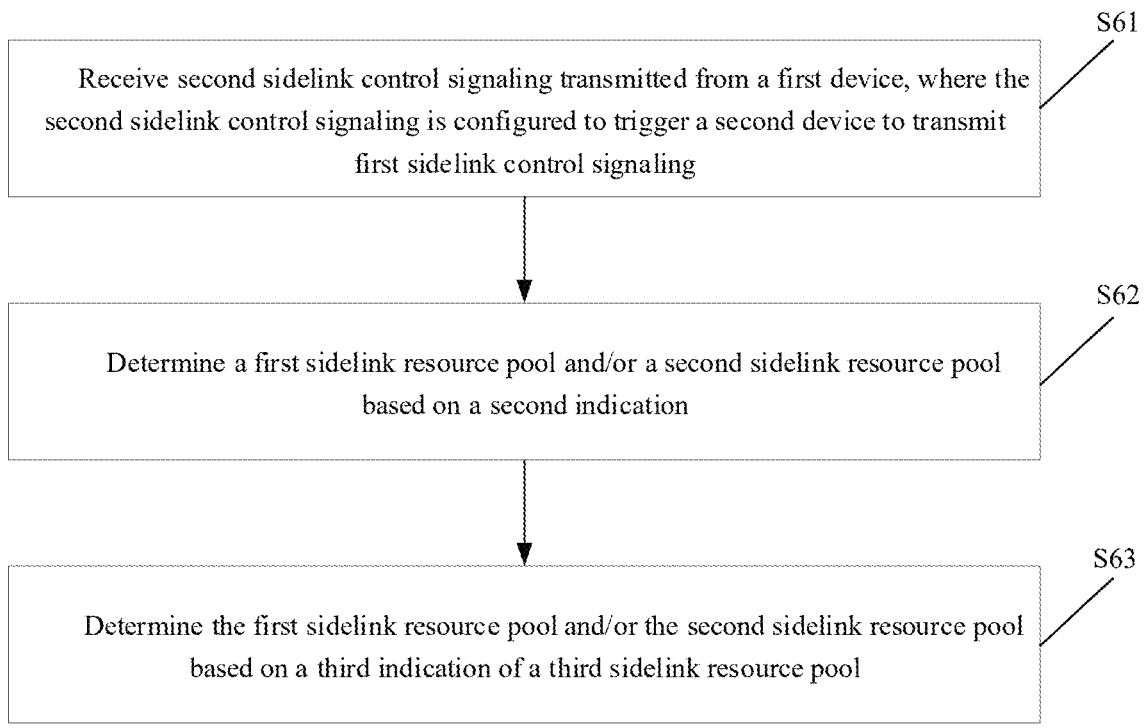
FIG. 7 is a flow diagram of still another method for selecting a resource according to an illustrative example.

FIG. 7 is a flow diagram of a method for selecting a resource according to an illustrative example. As shown in FIG. 7, the method for selecting a resource is applied to a second device and includes steps as follows.

In S61, second sidelink control signaling transmitted from a first device is received, where the second sidelink control signaling is configured to trigger the second device to transmit first sidelink control signaling.

In an embodiment, the second sidelink control signaling carries a second indication of a first sidelink resource pool and/or a second sidelink resource pool.

Under the condition that the second sidelink control signaling carries the second indication of the first sidelink resource pool and/or the second sidelink resource pool, the method for selecting a resource according to the example of the disclosure further includes S62 as follows.

In S62, the first sidelink resource pool and/or the second sidelink resource pool are/is determined based on the second indication.

In an embodiment, the second sidelink control signaling carries a third indication of a third sidelink resource pool, and the third sidelink resource pool is a sidelink resource pool to which a sidelink transmission resource selected by the first device belongs.

Under the condition that the second sidelink control signaling carries the third indication of the third sidelink resource pool, the method for selecting a resource according to the example of the disclosure further includes S63 as follows.

In S63, the first sidelink resource pool and/or the second sidelink resource pool are/is determined based on the third indication of the third sidelink resource pool.

It may be understood that S62 and S63 are alternative steps in the example of the disclosure.

In the method for selecting a resource according to the example of the disclosure, under the condition that the first device and/or the second device are/is configured with the plurality of sidelink resource pools, each of the plurality of sidelink resource pools performs inter-device resource coordination independently, and alternatively, inter-device resource coordination may be performed across the sidelink resource pools.

In an instance, under the condition of a plurality of Tx resource pools, each Tx resource pool performs inter-user coordination independently, and alternatively, inter-user coordination is performed across the Tx resource pools. The following description takes the first device as user equipment B and the second device as user equipment A as an instance.

Case one: inter-user coordination based on an independent Tx resource pool

It is assumed that the user equipment B is configured with a plurality of Tx resource pools. The plurality of Tx resource pools may be located on the same carrier frequency or not. What is not described in the following instance may also be understood as the condition that the plurality of Tx resource pools may be located on the same carrier frequency or not.

Whether each Tx resource pool supports selection of resources based on inter-user coordination may be determined by configuring or pre-configuring base station downlink signaling.

For resource selection in different Tx resource pools by the user equipment B, inter-user coordination is performed according to a resource pool for resource selection of the user equipment B.

It is assumed that the user equipment B selects a resource in a resource pool 1.

A time and frequency resource used for transmission of sidelink control signaling transmitted from the user equipment A to the user equipment B belongs to the resource pool 1. The sidelink control signaling includes or indicates time and frequency resource set information that the user equipment B needs to consider when selecting a resource in the resource pool 1. The sidelink control signaling may be physical layer sidelink control signaling, MAC layer sidelink control signaling, or RRC layer sidelink control signaling.

The time and frequency resource set information included in the sidelink control signaling also belongs to the resource pool 1.

If transmission of the sidelink control signaling is activated by receiving another sidelink control signaling (signaling 2) transmitted from the user equipment B, a time and frequency resource used for transmission of the signaling 2 belongs to the resource pool 1.

If transmission of the sidelink control signaling is triggered by sensing a sidelink channel or measuring a sidelink channel/signal, the sensed or measured sidelink channel or sidelink signal belongs to the resource pool 1.

Case two: user coordination across Tx resource pools

It is assumed that the user equipment B is configured with a plurality of Tx resource pools.

A subset of the Tx resource pool may be indicated through configuration or pre-configuration. The Tx resource pool in the subset may be configured to transmit inter-user coordination information (such as sidelink control signaling, including a resource set, transmitted from the user equipment A (UE A) to the user equipment B (UE B) or sidelink control signaling transmitted from the UE B to trigger the UE A to perform coordination).

For instance, a specific carrier is configured for a multi-carrier system, and the Tx resource pool on the specific carrier may be configured to transmit of the inter-user coordination information.

Assuming that the sidelink control signaling transmitted from the user equipment A to the user equipment B includes or indicates time and frequency resource set information that the user equipment B needs to consider when selecting a resource, and the time and frequency resource set may include time and frequency resources in one or more Tx resource pools.

Which Tx resource set or sets the time and frequency resources included in the time and frequency resource set belong to is determined by using the following modes:

The user equipment A determines the Tx resource pool or resource pool set to which the time and frequency resource set belongs according to the Tx resource pool configured or pre-configured.

The user equipment A determines the Tx resource pool or resource pool set to which the time and frequency resource set belongs according to the Tx resource pool to which transmission of the sidelink control signaling belongs. For instance, in a multi-carrier system, a Tx resource pool (set) on the same carrier as the Tx resource pool to which the transmission of the sidelink control signaling belongs is selected.

The user equipment selects a Tx resource pool or resource pool set according to a channel sensing or channel/signal measurement result. For instance, selection is performed according to a measurement value of a CBR. For instance, a Tx resource pool having a minimum CBR measurement value or a CBR measurement value smaller than a certain threshold (that is, a congestion situation is not serious) is selected.

If transmission of the sidelink control signaling is activated by receiving another sidelink control signaling (signaling 2) transmitted from the user equipment B, the signaling 2 includes an indication of a Tx resource pool or a Tx resource pool set used by the user equipment B to select a resource, and the user equipment A determines the Tx resource pool or resource pool set to which the time and frequency resource set belongs according to the indication.

If transmission of the sidelink control signaling is triggered by sensing a sidelink channel or measuring a sidelink channel/signal, the user equipment A determines a Tx resource pool or resource pool set to which the time and frequency resource set belongs according to a Tx resource pool to which the sensed or measured sidelink channel or sidelink signal triggering the transmission of the sidelink control signaling belongs.

The Tx resource pool to which the resources used for transmission of the sidelink control signaling transmitted from the user equipment A belong by using the following modes:

The user equipment A determines the Tx resource pool or resource pool set to which the transmission of the sidelink control signaling belongs according to the user-coordinated Tx resource pool or resource pool set configured or pre-configured.

The user equipment A determines the Tx resource pool according to some specific rule. For instance, the Tx resource pool is determined according to a configuration order of the Tx resource pools, and alternatively, is randomly selected from a plurality of Tx resource pools, and alternatively, is determined according to priority information of data to be transmitted.

The user equipment selects the Tx resource pool or resource pool set according to the channel sensing or channel/signal measurement result. For instance, selection is performed according to the measurement value of the CBR. For instance, the Tx resource pool having a minimum CBR measurement value or a CBR measurement value smaller than a certain threshold (that is, a congestion situation is not serious) is selected.

If transmission of the sidelink control signaling is activated by receiving another sidelink control signaling (signaling 2) transmitted from the user equipment B, the signaling 2 includes an indication of a Tx resource pool or resource pool set used by the user equipment A to transmit the sidelink control signaling, and the user equipment A determines the Tx resource pool (set) according to the indication.

If transmission of the sidelink control signaling is triggered by sensing a sidelink channel or measuring a sidelink channel/signal, the user equipment A determines the Tx resource pool (set) to which the resources used for transmission of the sidelink control signaling belong according to the Tx resource pool to which the sensed or measured sidelink channel or sidelink signal triggering the transmission of the sidelink control signaling belongs.

If transmission of the sidelink control signaling is activated by receiving another sidelink control signaling (signaling 2) transmitted from the user equipment B, the Tx resource pool used for transmission of signaling 2 is determined by using the following modes:

The user equipment B determines the Tx resource pool or resource pool set to which the time and frequency resource set belongs according to the configured or pre-configured Tx resource pool or the Tx resource pool used for signaling transmission coordination.

The user equipment B determines the Tx resource pool according to some specific rule. For instance, the Tx resource pool is determined according to the configuration order of the Tx resource pools, and alternatively, is randomly selected from the plurality of Tx resource pools, and alternatively, is determined according to priority information of data to be transmitted.

The user equipment B selects the Tx resource pool or resource pool set according to the channel sensing or channel/signal measurement result. For instance, selection is performed according to the measurement value of the CBR. For instance, the Tx resource pool having a minimum CBR measurement value or a CBR measurement value smaller than a certain threshold (that is, a congestion situation is not serious) is selected.

Through the method for selecting a resource according to the example of the disclosure, the devices may coordinate resources with each other when the plurality of sidelink resource pools are configured between the devices.

It may be understood that the method for selecting a resource according to the example of the disclosure may be applied to a process of implementing resource selection through interaction between the first device and the second device. For the process of implementing resource selection through interaction between the first device and the second device, the first device and the second device have respective functions for executing the above method for selecting a resource. Reference may be made to the relevant description of the above examples for the details, which will not be repeated herein.

It is to be noted that those skilled in the art can understand that all the above embodiments/examples related to the example of the disclosure can be used together with the above-mentioned examples or independently. Whether the embodiments/examples are used independently or in combination with the above-mentioned examples, they have a similar implementation principle. In implementation of the disclosure, some examples are described as the embodiment used together. Certainly, those skilled in the art can understand that such illustration is not a limitation of the example of the disclosure.

Based on the same concept, an example of the disclosure further provides an apparatus for selecting a resource.

It may be understood that the apparatus for selecting a resource according to the example of the disclosure includes corresponding hardware structures and/or software modules for executing respective functions, so as to achieve the above functions. In combination with units and algorithmic steps of each instance disclosed in the example of the disclosure, the example of the disclosure may be implemented in the form of hardware or a combination of hardware and computer software. Whether some function is executed in a mode of hardware or of driving hardware by computer software depends on a specific application and the design constraints of the technical solution. Those skilled in the art may achieve the described functions for each particular application through different methods, but such implementation is not considered to be beyond the scope of the technical solution of the example of the disclosure.

Figure 8:
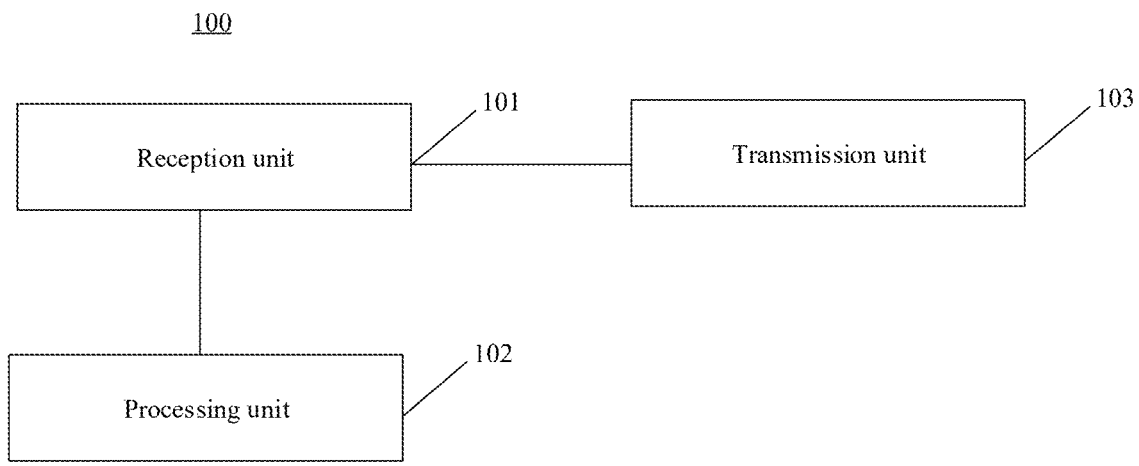
FIG. 8 is a block diagram of an apparatus for selecting a resource according to an illustrative example.

FIG. 8 is a block diagram of an apparatus for selecting a resource according to an illustrative example. With reference to FIG. 8, the apparatus 100 for selecting a resource is applied to a first device. The apparatus 100 for selecting a resource includes a reception unit 101 and a processing unit 102.

The reception unit 101 is configured to receive first sidelink control signaling transmitted from a second device by using a first sidelink resource pool, where the first sidelink control signaling includes an indication of an auxiliary time and frequency resource set, and the auxiliary time and frequency resource set belongs to a second sidelink resource pool and is configured to assist the first device in selecting a resource. The processing unit 102 is configured to select a sidelink transmission resource from a third sidelink resource pool based on the auxiliary time and frequency resource set.

In an embodiment, the first device is configured or pre-configured with a plurality of sidelink resource pools, and the third sidelink resource pool is one or more sidelink resource pools in the plurality of sidelink resource pools.

In an embodiment, the first sidelink resource pool and/or the second sidelink resource pool are/is determined based on the third sidelink resource pool.

In an embodiment, the first sidelink resource pool and/or the third sidelink resource pool are/is the same sidelink resource pool as the third sidelink resource pool.

In an embodiment, the third sidelink resource pool includes a time and frequency resource triggering the second device to transmit the first sidelink control signaling.

In an embodiment, the processing unit 102 is further configured to determine, according to configuration or pre-configuration information, whether a sidelink resource pool supports selection of the sidelink transmission resource based on the auxiliary time and frequency resource set.

In an embodiment, the third sidelink resource pool is a sidelink resource pool supporting selection of the sidelink transmission resource based on the auxiliary time and frequency resource set.

In an embodiment, the first device is configured or pre-configured with a plurality of sidelink resource pools, and the first sidelink resource pool is one or more sidelink resource pools in the plurality of sidelink resource pools.

In an embodiment, the first sidelink resource pool is determined by using one or a combination of the following modes:

the first sidelink resource pool is determined based on configuration information, where the configuration information is obtained by receiving base station downlink signaling or through pre-configuration; the first sidelink resource pool is determined based on a set rule; the first sidelink resource pool is determined based on a channel sensing or signal measurement result; and the first sidelink resource pool is determined based on a time and frequency resource triggering the second device to transmit the first sidelink control signaling.

In an embodiment, the first device is configured or pre-configured with a plurality of sidelink resource pools, and the second sidelink resource pool is one or more sidelink resource pools in the plurality of sidelink resource pools.

In an embodiment, the second sidelink resource pool is determined by using one or a combination of the following modes:

the second sidelink resource pool is determined based on configuration information, where the configuration information is obtained by receiving base station downlink signaling or through pre-configuration; the second sidelink resource pool is determined according to a first indication in the first sidelink control signaling; the second sidelink resource pool is determined according to a time and frequency resource used for transmission of the first sidelink control signaling; the second sidelink resource pool is determined according to a channel sensing or signal measurement result; and the second sidelink resource pool is determined based on a time and frequency resource triggering the second device to transmit the first sidelink control signaling.

In an embodiment, the time and frequency resource triggering the second device to transmit the first sidelink control signaling includes one or a combination of the following:

a time and frequency resource used by second sidelink control signaling transmitted from the first device; a time and frequency resource used by a sidelink channel sensed or measured by the first device; and a time and frequency resource used by a sidelink signal sensed or measured by the first device.

In an embodiment, the apparatus 100 for selecting a resource further includes a transmission unit 103. The transmission unit 103 is configured to transmit the second sidelink control signaling, where the second sidelink control signaling is configured to trigger the second device to transmit the first sidelink control signaling.

In an embodiment, the processing unit 102 is further configured to determine a fourth sidelink resource pool to which the time and frequency resource used by the second sidelink control signaling belongs.

In an embodiment, the fourth sidelink resource pool to which the time and frequency resource used by the second sidelink control signaling belongs is determined as follows:

the fourth sidelink resource pool is determined according to the configuration information, where the configuration information is obtained by receiving the base station downlink signaling or through pre-configuration; the fourth sidelink resource pool is determined based on the set rule; the fourth sidelink resource pool is determined based on the channel sensing or signal measurement result; and the fourth sidelink resource pool is determined based on the third sidelink resource pool.

In an embodiment, the second sidelink control signaling carries a second indication of the first sidelink resource pool and/or the second sidelink resource pool.

In an embodiment, the second sidelink control signaling carries a third indication of the third sidelink resource pool.

Figure 9:
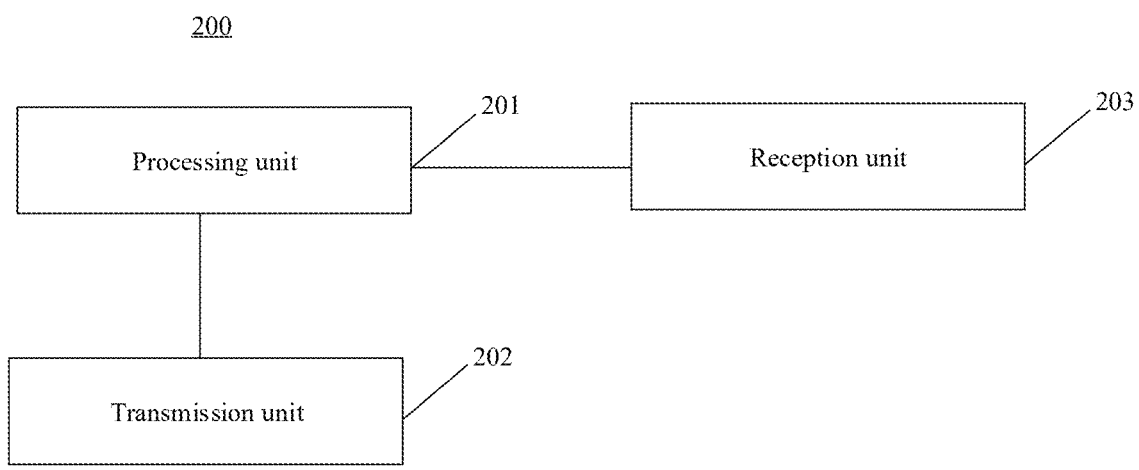
FIG. 9 is a block diagram of another apparatus for selecting a resource according to an illustrative example.

FIG. 9 is a block diagram of another apparatus for selecting a resource according to an illustrative example. With reference to FIG. 9, the apparatus 200 for selecting a resource is applied to a second device. The apparatus 200 for selecting a resource includes a processing unit 201 and a transmission unit 202.

The processing unit 201 is configured to determine, in response to determining that the second device is configured or pre-configured with a plurality of sidelink resource pools, a first sidelink resource pool from the plurality of sidelink resource pools. The transmission unit 202 is configured to transmit first sidelink control signaling by using the first sidelink resource pool, where the first sidelink control signaling includes an indication of an auxiliary time and frequency resource set, and the auxiliary time and frequency resource set belongs to a second sidelink resource pool and is configured to assist a first device in selecting a resource.

In an embodiment, the first sidelink resource pool is one or more sidelink resource pools in the plurality of sidelink resource pools.

In an embodiment, the first sidelink resource pool is determined by using one or a combination of the following modes:
the first sidelink resource pool is determined based on configuration information, where the configuration information is obtained by receiving base station downlink signaling or through pre-configuration; the first sidelink resource pool is determined based on a set rule; the first sidelink resource pool is determined based on a channel sensing or signal measurement result; and the first sidelink resource pool is determined based on a time and frequency resource triggering the second device to transmit the first sidelink control signaling.

In an embodiment, the second sidelink resource pool is one or more sidelink resource pools in the plurality of sidelink resource pools.

In an embodiment, the second sidelink resource pool is determined by using one or a combination of the following modes:
the second sidelink resource pool is determined based on configuration information, where the configuration information is obtained by receiving base station downlink signaling or through pre-configuration; the second sidelink resource pool is determined according to a time and frequency resource used for transmission of the first sidelink control signaling; the second sidelink resource pool is determined according to a channel sensing or signal measurement result; and the second sidelink resource pool is determined based on a time and frequency resource triggering the second device to transmit the first sidelink control signaling.

In an embodiment, the first sidelink control signaling carries a first indication of the second sidelink resource pool.

In an embodiment, the apparatus 200 for selecting a resource further includes a reception unit 203. The reception unit 203 is configured to receive second sidelink control signaling transmitted from the first device, where the second sidelink control signaling is configured to trigger the second device to transmit the first sidelink control signaling.

In an embodiment, the second sidelink control signaling carries a second indication of the first sidelink resource pool and/or the second sidelink resource pool. The processing unit 201 is further configured to determine the first sidelink resource pool and/or the second sidelink resource pool based on the second indication.

In an embodiment, the second sidelink control signaling carries a third indication of a third sidelink resource pool, and the third sidelink resource pool is a sidelink resource pool to which a sidelink transmission resource selected by the first device belongs. The processing unit 201 is further configured to determine the first sidelink resource pool and/or the second sidelink resource pool based on the third indication of the third sidelink resource pool.

For the apparatus in the above examples, a specific method for each module to execute an operation is described in detail in the examples relating to the method, and will not be described in detail herein.

Figure 10:
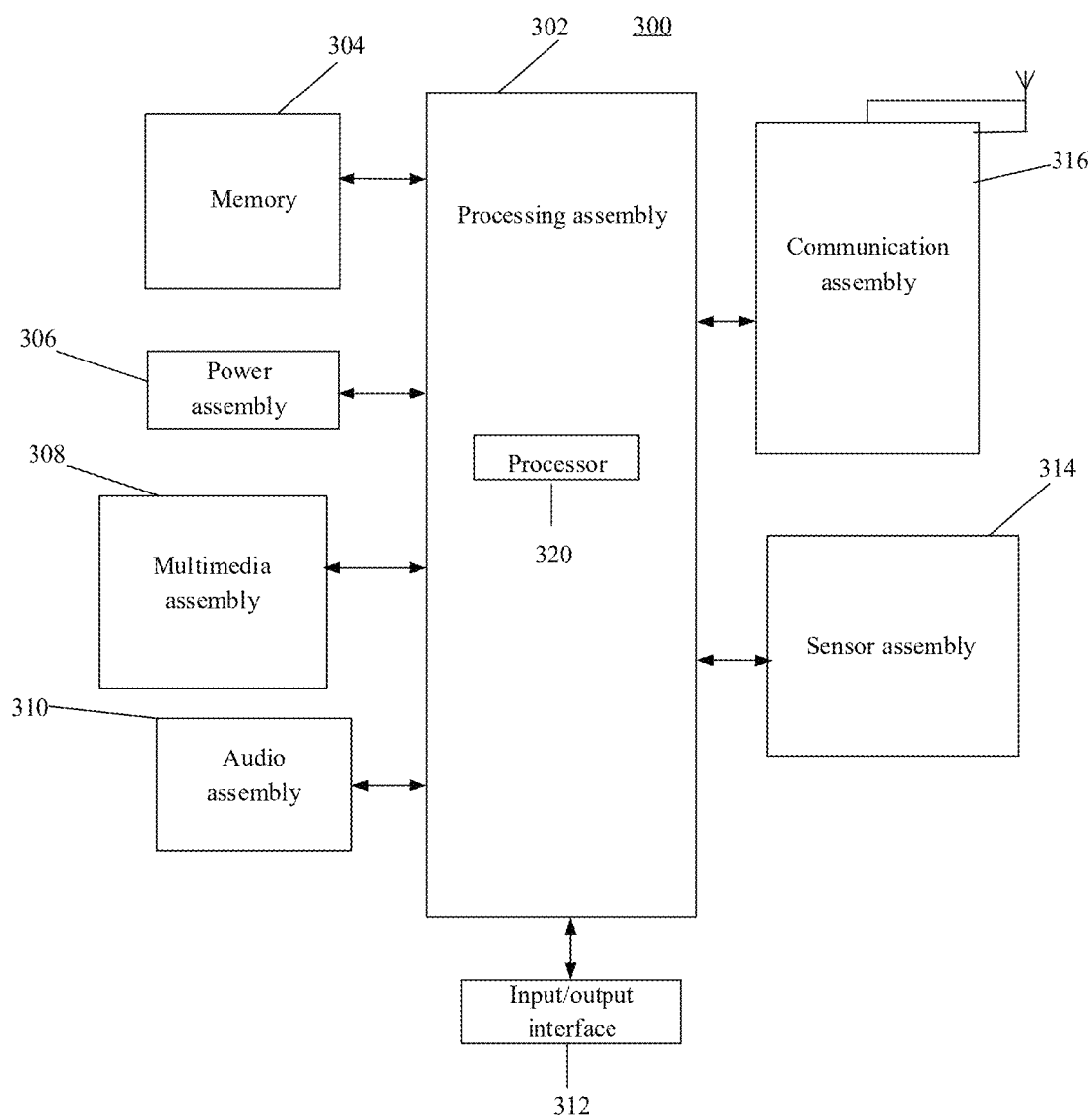
FIG. 10 is a block diagram of yet another apparatus for selecting a resource according to an illustrative example.

FIG. 10 is a block diagram of yet another apparatus 300 for selecting a resource according to an illustrative example. For instance, the apparatus 300 may be a mobile phone, a computer, a digital broadcast terminal, a messaging device, a game console, a tablet device, a medical device, a fitness device, a personal digital assistant, etc.

With reference to FIG. 10, the apparatus 300 may include one or more of the following assemblies: a processing assembly 302, a memory 304, a power assembly 306, a multimedia assembly 308, an audio assembly 310, an input/output (I/O) interface 312, a sensor assembly 314, and a communication assembly 316.

The processing assembly 302 generally controls all operations of the apparatus 300, such as operations associated with display, telephone call, data communication, camera operation, and recording operation. The processing assembly 302 may include one or more processors 320 configured to execute an instruction, so as to complete all or some steps of the method. In addition, the processing assembly 302 may include one or more modules to facilitate interaction between the processing assembly 302 and other assemblies. For instance, the processing assembly 302 may include a multimedia module to facilitate interaction between the multimedia assembly 308 and the processing assembly 302.

The memory 304 is configured to store various types of data, so as to support the operations on the apparatus 300. Instances of the data include an instruction for any application or method operating on the apparatus 300, contact data, phone book data, a message, a picture, a video, etc. The memory 304 may be implemented by any type of volatile or nonvolatile memory device or their combination, such as a static random access memory (SRAM), an electrically erasable programmable read-only memory (EEPROM), an erasable programmable read-only memory (EPROM), a programmable read-only memory (PROM), a read-only memory (ROM), a magnetic memory, a flash memory, a magnetic disk, or an optical disk.

The power assembly 306 supplies power to various assemblies of the apparatus 300. The power assembly 306 may include a power management system, one or more power supplies, and other assemblies associated with generating, managing, and distributing power for the apparatus 300.

The multimedia assembly 308 includes a screen that provides an output interface between the apparatus 300 and a user. In some examples, the screen may include a liquid crystal display (LCD) and a touch panel (TP). If the screen includes the touch panel, the screen may be implemented as a touch screen to receive an input signal from the user. The touch panel includes one or more touch sensors to sense touch, slide, and gestures on the touch panel. The touch sensor may sense a boundary of a touch or slide operation, and detect duration and pressure related to the touch or slide operation. In some examples, the multimedia assembly 308 includes a front-facing camera and/or a rear-facing camera. When the apparatus 300 is in an operation mode, such as a photographing mode or a video mode, the front-facing camera and/or the rear-facing camera may receive external multimedia data. Each of the front-facing camera and the rear-facing camera may be a fixed optical lens system or have a focal length and optical zoom capability.

The audio assembly 310 is configured to output and/or input an audio signal. For instance, the audio assembly 310 includes a microphone (MIC). The microphone is configured to receive an external audio signal when the apparatus 300 is in operation modes such as a call mode, a recording mode, and a speech identification mode. The received audio signal may be further stored in the memory 304 or transmitted via the communication assembly 316. In some examples, the audio assembly 310 further includes a speaker configured to output an audio signal.

The I/O interface 312 provides an interface between the processing assembly 302 and a peripheral interface module. The peripheral interface module may be a keyboard, a click wheel, a button, etc. The buttons may include, but are not limited to, a home button, a volume button, a start button, and a lock button.

The sensor assembly 314 includes one or more sensors for providing various aspects of state assessment for the apparatus 300. For instance, the sensor assembly 314 may detect an on/off state of the apparatus 300 and relative positioning of the assemblies such as a display and a keypad of the apparatus 300, and the sensor assembly 314 may further detect position change of the apparatus 300 or an assembly of the apparatus 300, presence or absence of contact between the user and the apparatus 300, an orientation or acceleration/deceleration of the apparatus 300 and temperature change of the apparatus 300. The sensor assembly 314 may include a proximity sensor configured to detect the presence of a nearby object without any physical contact. The sensor assembly 314 may further include an optical sensor, such as a complementary metal-oxide-semiconductor (CMOS) or charge-coupled device (CCD) image sensor, which is used in an imaging application. In some examples, the sensor assembly 314 may further include an acceleration sensor, a gyroscope sensor, a magnetic sensor, a pressure sensor, or a temperature sensor.

The communication assembly 316 is configured to facilitate wired or radio communication between the apparatus 300 and other devices. The apparatus 300 may access a wireless network based on a communication standard, such as WiFi, the 2nd generation mobile communication technology (2G), the 3rd generation mobile communication technology (3G), or their combination. In an illustrative example, the communication assembly 316 receives a broadcast signal or broadcast-related information from an external broadcast management system via a broadcast channel. In an illustrative example, the communication assembly 316 further includes a near field communication (NFC) module to facilitate short-range communication. For instance, the NFC module may be implemented based on a radio frequency identification (RFID) technology, an infrared data association (IrDA) technology, an ultrawide band (UWB) technology, a Bluetooth (BT) technology, or other technologies.

In an illustrative example, the apparatus 300 may be implemented by one or more of an application-specific integrated circuit (ASIC), a digital signal processor (DSP), a digital signal processing device (DSPD), a programmable logic device (PLD), a field programmable gate array (FPGA), a controller, a microcontroller, a microprocessor or other electronic components, thus executing the method.

In an illustrative example, there is further provided a non-transitory computer-readable storage medium including an instruction, such as the memory 304 including an instruction. The instruction may be executed by the processor 320 of the apparatus 300 so as to complete the method. For instance, the non-transitory computer-readable storage medium may be a ROM, a random access memory (RAM), a CD-ROM, a magnetic tape, a floppy disk, an optical data storage device, etc.

It can be further understood that "a plurality of" in the disclosure refers to two or more, and that other quantifiers are similar. When describing an association relation of associated objects, "and/or" means that there may be three relations, for instance, A and/or B, which may mean that A exists independently, A and B exist at the same time, or B exists independently. The character "/" generally means an "or" relation between two associated context objects. The singular forms such as "a", "the", and "this" are also intended to include the plural forms, unless otherwise clearly stated in the context.

It can be further understood that terms "first", "second", etc. are used to describe various information, but such information is not limited to these terms. These terms are used only to distinguish the same type of information from one another and do not indicate a particular order or level of importance. In fact, the expressions "first" and "second" can be used interchangeably. For instance, without departing from the scope of the disclosure, a first sidelink resource pool can also be called a second sidelink resource pool, and similarly, the second sidelink resource pool can also be called the first sidelink resource pool.

It can be further understood that although the operations are described in a specific order in the drawings in the examples of the disclosure, the operations are not required to be executed in the specific order or serial order shown, and alternatively, not all the operations shown are required to be executed to obtain desired results. Under specific circumstances, multitasking and parallel processing may be advantageous.

Those skilled in the art could easily conceive of other implementation solutions of the disclosure upon consideration of the description and the invention disclosed herein. The present application is intended to cover any variations, uses, or adaptive changes of the disclosure, which follow the general principles of the disclosure and include common general knowledge or conventional technical means not disclosed in the art. The description and the examples are regarded as merely illustrative, and the true scope and spirit of the disclosure are indicated by the following claims.

It is to be understood that the disclosure is not limited to a precise structure described above and illustrated in the accompanying drawings, and can have various modifications and changes without departing from the scope. The scope of the disclosure is limited merely by the appended claims.

A first aspect of an example of the disclosure provides a method for selecting a resource. The method for selecting a resource is applied to a first device and includes: receiving first sidelink control signaling transmitted from a second device by using a first sidelink resource pool, where the first sidelink control signaling includes an indication of an auxiliary time and frequency resource set, and the auxiliary time and frequency resource set belongs to a second sidelink resource pool and is configured to assist the first device in selecting a resource; and selecting a sidelink transmission resource from a third sidelink resource pool based on the auxiliary time and frequency resource set.

In an embodiment, the first device is configured or pre-configured with a plurality of sidelink resource pools, and the third sidelink resource pool is one or more sidelink resource pools in the plurality of sidelink resource pools.

In an embodiment, the first sidelink resource pool and/or the second sidelink resource pool are/is determined based on the third sidelink resource pool.

In an embodiment, the first sidelink resource pool and/or the third sidelink resource pool are/is the same sidelink resource pool as the third sidelink resource pool.

In an embodiment, the third sidelink resource pool includes a time and frequency resource triggering the second device to transmit the first sidelink control signaling.

In an embodiment, the method for selecting a resource further includes: determining, according to configuration or pre-configuration information, whether a sidelink resource pool supports selection of the sidelink transmission resource based on the auxiliary time and frequency resource set.

In an embodiment, the third sidelink resource pool is a sidelink resource pool supporting selection of the sidelink transmission resource based on the auxiliary time and frequency resource set.

In an embodiment, the first device is configured or pre-configured with a plurality of sidelink resource pools, and the first sidelink resource pool is one or more sidelink resource pools in the plurality of sidelink resource pools.

In an embodiment, the first sidelink resource pool is determined by using one or a combination of the following modes:
determining the first sidelink resource pool based on configuration information, where the configuration information is obtained by receiving base station downlink signaling or through pre-configuration; determining the first sidelink resource pool based on a set rule; determining the first sidelink resource pool based on a channel sensing or signal measurement result; and determining the first sidelink resource pool based on a time and frequency resource triggering the second device to transmit the first sidelink control signaling.

In an embodiment, the first device is configured or pre-configured with a plurality of sidelink resource pools, and the second sidelink resource pool is one or more sidelink resource pools in the plurality of sidelink resource pools.

In an embodiment, the second sidelink resource pool is determined by using one or a combination of the following modes:
determining the second sidelink resource pool based on configuration information, where the configuration information is obtained by receiving base station downlink signaling or through pre-configuration; determining the second sidelink resource pool according to a first indication in the first sidelink control signaling; determining the second sidelink resource pool according to a time and frequency resource used for transmission of the first sidelink control signaling; determining the second sidelink resource pool according to a channel sensing or signal measurement result; and determining the second sidelink resource pool based on a time and frequency resource triggering the second device to transmit the first sidelink control signaling.

In an embodiment, the time and frequency resource triggering the second device to transmit the first sidelink control signaling includes one or a combination of the following:
a time and frequency resource used by second sidelink control signaling transmitted from the first device; a time and frequency resource used by a sidelink channel sensed or measured by the first device; and a time and frequency resource used by a sidelink signal sensed or measured by the first device.

In an embodiment, the method for selecting a resource further includes: transmitting the second sidelink control signaling, where the second sidelink control signaling is configured to trigger the second device to transmit the first sidelink control signaling.

In an embodiment, the method for selecting a resource further includes: determining a fourth sidelink resource pool to which the time and frequency resource used by the second sidelink control signaling belongs.

In an embodiment, determining the fourth sidelink resource pool to which the time and frequency resource used by the second sidelink control signaling belongs includes: determining the fourth sidelink resource pool according to the configuration information, where the configuration information is obtained by receiving the base station downlink signaling or through pre-configuration; determining the fourth sidelink resource pool based on the set rule; determining the fourth sidelink resource pool based on the channel sensing or signal measurement result; and determining the fourth sidelink resource pool based on the third sidelink resource pool.

In an embodiment, the second sidelink control signaling carries a second indication of the first sidelink resource pool and/or the second sidelink resource pool.

In an embodiment, the second sidelink control signaling carries a third indication of the third sidelink resource pool.

A second aspect of an example of the disclosure provides a method for selecting a resource. The method for selecting a resource is applied to a second device and includes: determining, in response to determining that the second device is configured or pre-configured with a plurality of sidelink resource pools, a first sidelink resource pool from the plurality of sidelink resource pools; and transmitting first sidelink control signaling by using the first sidelink resource pool, where the first sidelink control signaling includes an indication of an auxiliary time and frequency resource set, and the auxiliary time and frequency resource set belongs to a second sidelink resource pool and is configured to assist a first device in selecting a resource.

In an embodiment, the first sidelink resource pool is one or more sidelink resource pools in the plurality of sidelink resource pools.

In an embodiment, the first sidelink resource pool is determined by using one or a combination of the following modes:
determining the first sidelink resource pool based on configuration information, where the configuration information is obtained by receiving base station downlink signaling or through pre-configuration; determining the first sidelink resource pool based on a set rule; determining the first sidelink resource pool based on a channel sensing or signal measurement result; and determining the first sidelink resource pool based on a time and frequency resource triggering the second device to transmit the first sidelink control signaling.

In an embodiment, the second sidelink resource pool is one or more sidelink resource pools in the plurality of sidelink resource pools.

In an embodiment, the second sidelink resource pool is determined by using one or a combination of the following modes:
  determining the second sidelink resource pool based on configuration information, where the configuration information is obtained by receiving base station downlink signaling or through pre-configuration; determining the second sidelink resource pool according to a time and frequency resource used for transmission of the first sidelink control signaling; determining the second sidelink resource pool according to a channel sensing or signal measurement result; and determining the second sidelink resource pool based on a time and frequency resource triggering the second device to transmit the first sidelink control signaling.

In an embodiment, the first sidelink control signaling carries a first indication of the second sidelink resource pool.

In an embodiment, the method for selecting a resource further includes:
  receiving second sidelink control signaling transmitted from the first device, where the second sidelink control signaling is configured to trigger the second device to transmit the first sidelink control signaling.

In an embodiment, the second sidelink control signaling carries a second indication of the first sidelink resource pool and/or the second sidelink resource pool; and the method for selecting a resource further includes: determining the first sidelink resource pool and/or the second sidelink resource pool based on the second indication.

In an embodiment, the second sidelink control signaling carries a third indication of a third sidelink resource pool, and the third sidelink resource pool is a sidelink resource pool to which a sidelink transmission resource selected by the first device belongs; and the method for selecting a resource further includes: determining the first sidelink resource pool and/or the second sidelink resource pool based on the third indication of the third sidelink resource pool.

A third aspect of an example of the disclosure provides an apparatus for selecting a resource. The apparatus for selecting a resource is applied to a first device and includes:
  a reception unit configured to receive first sidelink control signaling transmitted from a second device by using a first sidelink resource pool, where the first sidelink control signaling includes an indication of an auxiliary time and frequency resource set, and the auxiliary time and frequency resource set belongs to a second sidelink resource pool and is configured to assist the first device in selecting a resource; and a processing unit configured to select a sidelink transmission resource from a third sidelink resource pool based on the auxiliary time and frequency resource set.

In an embodiment, the first device is configured or pre-configured with a plurality of sidelink resource pools, and the third sidelink resource pool is one or more sidelink resource pools in the plurality of sidelink resource pools.

In an embodiment, the first sidelink resource pool and/or the second sidelink resource pool are/is determined based on the third sidelink resource pool.

In an embodiment, the first sidelink resource pool and/or the third sidelink resource pool are/is the same sidelink resource pool as the third sidelink resource pool.

In an embodiment, the third sidelink resource pool includes a time and frequency resource triggering the second device to transmit the first sidelink control signaling.

In an embodiment, the processing unit is further configured to determine, according to configuration or pre-configuration information, whether a sidelink resource pool supports selection of the sidelink transmission resource based on the auxiliary time and frequency resource set.

In an embodiment, the third sidelink resource pool is a sidelink resource pool supporting selection of the sidelink transmission resource based on the auxiliary time and frequency resource set.

In an embodiment, the first device is configured or pre-configured with a plurality of sidelink resource pools, and the first sidelink resource pool is one or more sidelink resource pools in the plurality of sidelink resource pools.

In an embodiment, the first sidelink resource pool is determined by using one or a combination of the following modes:
  determining the first sidelink resource pool based on configuration information, where the configuration information is obtained by receiving base station downlink signaling or through pre-configuration; determining the first sidelink resource pool based on a set rule; determining the first sidelink resource pool based on a channel sensing or signal measurement result; and determining the first sidelink resource pool based on a time and frequency resource triggering the second device to transmit the first sidelink control signaling.

In an embodiment, the first device is configured or pre-configured with a plurality of sidelink resource pools, and the second sidelink resource pool is one or more sidelink resource pools in the plurality of sidelink resource pools.

In an embodiment, the second sidelink resource pool is determined by using one or a combination of the following modes:
  determining the second sidelink resource pool based on configuration information, where the configuration information is obtained by receiving base station downlink signaling or through pre-configuration; determining the second sidelink resource pool according to a first indication in the first sidelink control signaling; determining the second sidelink resource pool according to a time and frequency resource used for transmission of the first sidelink control signaling; determining the second sidelink resource pool according to a channel sensing or signal measurement result; and determining the second sidelink resource pool based on a time and frequency resource triggering the second device to transmit the first sidelink control signaling.

In an embodiment, the time and frequency resource triggering the second device to transmit the first sidelink control signaling includes one or a combination of the following:
  a time and frequency resource used by second sidelink control signaling transmitted from the first device; a time and frequency resource used by a sidelink channel sensed or measured by the first device; and a time and frequency resource used by a sidelink signal sensed or measured by the first device.

In an embodiment, the apparatus for selecting a resource further includes a transmission unit. The transmission unit is configured to transmit the second sidelink control signaling, where the second sidelink control signaling is configured to trigger the second device to transmit the first sidelink control signaling.

In an embodiment, the processing unit is further configured to determine a fourth sidelink resource pool to which the time and frequency resource used by the second sidelink control signaling belongs.

In an embodiment, the fourth sidelink resource pool to which the time and frequency resource used by the second sidelink control signaling belongs is determined as follows: the fourth sidelink resource pool is determined according to the configuration information, where the configuration information is obtained by receiving the base station downlink signaling or through pre-configuration; the fourth sidelink resource pool is determined based on the set rule; the fourth sidelink resource pool is determined based on the channel sensing or signal measurement result; and the fourth sidelink resource pool is determined based on the third sidelink resource pool.

In an embodiment, the second sidelink control signaling carries a second indication of the first sidelink resource pool and/or the second sidelink resource pool.

In an embodiment, the second sidelink control signaling carries a third indication of the third sidelink resource pool.

A fourth aspect of an example of the disclosure provides an apparatus for selecting a resource. The apparatus for selecting a resource is applied to a second device and includes:
- a processing unit configured to determine, in response to determining that the second device is configured or pre-configured with a plurality of sidelink resource pools, a first sidelink resource pool from the plurality of sidelink resource pools; and a transmission unit configured to transmit first sidelink control signaling by using the first sidelink resource pool, where the first sidelink control signaling includes an indication of an auxiliary time and frequency resource set, and the auxiliary time and frequency resource set belongs to a second sidelink resource pool and is configured to assist a first device in selecting a resource.

In an embodiment, the first sidelink resource pool is one or more sidelink resource pools in the plurality of sidelink resource pools.

In an embodiment, the first sidelink resource pool is determined by using one or a combination of the following modes:
- determining the first sidelink resource pool based on configuration information, where the configuration information is obtained by receiving base station downlink signaling or through pre-configuration; determining the first sidelink resource pool based on a set rule; determining the first sidelink resource pool based on a channel sensing or signal measurement result; and determining the first sidelink resource pool based on a time and frequency resource triggering the second device to transmit the first sidelink control signaling.

In an embodiment, the second sidelink resource pool is one or more sidelink resource pools in the plurality of sidelink resource pools.

In an embodiment, the second sidelink resource pool is determined by using one or a combination of the following modes:
- determining the second sidelink resource pool based on configuration information, where the configuration information is obtained by receiving base station downlink signaling or through pre-configuration; determining the second sidelink resource pool according to a time and frequency resource used for transmission of the first sidelink control signaling; determining the second sidelink resource pool according to a channel sensing or signal measurement result; and determining the second sidelink resource pool based on a time and frequency resource triggering the second device to transmit the first sidelink control signaling.

In an embodiment, the first sidelink control signaling carries a first indication of the second sidelink resource pool.

In an embodiment, the apparatus for selecting a resource further includes a reception unit. The reception unit is configured to receive second sidelink control signaling transmitted from the first device, where the second sidelink control signaling is configured to trigger the second device to transmit the first sidelink control signaling.

In an embodiment, the second sidelink control signaling carries a second indication of the first sidelink resource pool and/or the second sidelink resource pool; and the processing unit is further configured to determine the first sidelink resource pool and/or the second sidelink resource pool based on the second indication.

In an embodiment, the second sidelink control signaling carries a third indication of a third sidelink resource pool, and the third sidelink resource pool is a sidelink resource pool to which a sidelink transmission resource selected by the first device belongs; and the processing unit is further configured to determine the first sidelink resource pool and/or the second sidelink resource pool based on the third indication of the third sidelink resource pool.

A fifth aspect of an example of the disclosure provides an apparatus for selecting a resource. The apparatus for selecting a resource includes:
- a processor, and a memory configured to store an instruction executable by the processor, where
- the processor is configured to execute the method for selecting a resource according to the first aspect or any one of the embodiments of the first aspect.

A sixth aspect of an example of the disclosure provides an apparatus for selecting a resource. The apparatus for selecting a resource includes:
- a processor, and a memory configured to store an instruction executable by the processor, where
- the processor is configured to execute the method for selecting a resource according to the second aspect or any one of the embodiments of the second aspect.

A seventh aspect of an example of the disclosure provides a non-transitory computer-readable storage medium. When an instruction in the storage medium is executed by a processor of a mobile terminal, the mobile terminal is capable of executing the method for selecting a resource according to the first aspect or any one of the embodiments of the first aspect.

An eighth aspect of an example of the disclosure provides a non-transitory computer-readable storage medium. When an instruction in the storage medium is executed by a processor of a mobile terminal, the mobile terminal is capable of executing the method for selecting a resource according to the second aspect or any one of the embodiments of the second aspect.

What is claimed is:

1. A method for selecting a resource, performed by a first device and comprising:
   receiving first sidelink control signaling transmitted from a second device by using a first sidelink resource pool, wherein the first sidelink control signaling comprises an indication of an auxiliary time and frequency resource set, and the auxiliary time and frequency resource set belongs to a second sidelink resource pool and is configured to assist the first device in selecting a resource; and selecting a sidelink transmission resource from a third sidelink resource pool based on the auxiliary time and frequency resource set;

wherein the first device is configured or pre-configured with a plurality of sidelink resource pools, and the third sidelink resource pool is one or more sidelink resource pools in the plurality of sidelink resource pools;

wherein the third sidelink resource pool comprises a time and frequency resource triggering the second device to transmit the first sidelink control signaling, and the time and frequency resource triggering the second device to transmit the first sidelink control signaling comprises at least one of:

a time and frequency resource used by second sidelink control signaling transmitted from the first device, wherein the second sidelink control signaling is configured to trigger the second device to transmit the first sidelink control signaling;

a time and frequency resource used by a sidelink channel sensed or measured by the first device; or a time and frequency resource used by a sidelink signal sensed or measured by the first device.

2. The method for selecting the resource according to claim 1, wherein at least one of the first sidelink resource pool or the second sidelink resource pool is determined based on the third sidelink resource pool;

wherein at least one of the first sidelink resource pool or the second sidelink resource pool is the same sidelink resource pool as the third sidelink resource pool.

3. The method for selecting the resource according to claim 1, further comprising:

determining, according to configuration information or pre-configuration, that the third sidelink resource pool is a sidelink resource pool supporting selection of the sidelink transmission resource based on the auxiliary time and frequency resource set.

4. The method for selecting the resource according to claim 1, wherein the first sidelink resource pool is determined by using at least one of the following modes:

determining the first sidelink resource pool based on configuration information or pre-configuration;

determining the first sidelink resource pool based on a set rule;

determining the first sidelink resource pool based on a channel sensing result or a signal measurement result; or determining the first sidelink resource pool based on a time and frequency resource triggering the second device to transmit the first sidelink control signaling.

5. The method for selecting the resource according to claim 1, wherein the second sidelink resource pool is determined by using at least one of the following modes:

determining the second sidelink resource pool based on configuration information or pre-configuration;

determining the second sidelink resource pool according to a first indication in the first sidelink control signaling;

determining the second sidelink resource pool according to a time and frequency resource used for transmission of the first sidelink control signaling;

determining the second sidelink resource pool according to a channel sensing result or a signal measurement result; or determining the second sidelink resource pool based on a time and frequency resource triggering the second device to transmit the first sidelink control signaling.

6. The method for selecting the resource according to claim 1, further comprising:

transmitting the second sidelink control signaling.

7. The method for selecting the resource according to claim 6, further comprising:

determining a fourth sidelink resource pool to which the time and frequency resource used by the second sidelink control signaling belongs;

wherein determining the fourth sidelink resource pool to which the time and frequency resource used by the second sidelink control signaling belongs comprises at least one of:

determining the fourth sidelink resource pool according to the configuration information or pre-configuration;

determining the fourth sidelink resource pool based on the set rule;

determining the fourth sidelink resource pool based on a channel sensing result or a signal measurement result; or determining the fourth sidelink resource pool based on the third sidelink resource pool.

8. The method for selecting the resource according to claim 6, wherein the second sidelink control signaling carries a second indication of at least one of the first sidelink resource pool or the second sidelink resource pool, or wherein the second sidelink control signaling carries a third indication of the third sidelink resource pool.

9. A non-transitory computer-readable storage medium, wherein instructions in the storage medium, when executed by a processor of a mobile terminal, cause the mobile terminal to perform the method for selecting the resource according to claim 1.

10. The method for selecting the resource according to claim 1, wherein the plurality of sidelink resource pools configured or pre-configured for the first device are resource pools configured on the same bandwidth part (BWP) or carrier frequency, or resource pools configured on different BWPs or carrier frequencies.

11. A method for selecting a resource, performed by a second device and comprising:

determining the second device is configured or pre-configured with a plurality of sidelink resource pools;

determining a first sidelink resource pool from the plurality of sidelink resource pools; and transmitting first sidelink control signaling by using the first sidelink resource pool, wherein the first sidelink control signaling comprises an indication of an auxiliary time and frequency resource set, and the auxiliary time and frequency resource set belongs to a second sidelink resource pool and is configured to assist a first device in selecting a resource;

wherein the third sidelink resource pool comprises a time and frequency resource triggering the second device to transmit the first sidelink control signaling, and the time and frequency resource triggering the second device to transmit the first sidelink control signaling comprises at least one of:

a time and frequency resource used by second sidelink control signaling transmitted from the first device, wherein the second sidelink control signaling is configured to trigger the second device to transmit the first sidelink control signaling;

a time and frequency resource used by a sidelink channel sensed or measured by the first device; or a time and frequency resource used by a sidelink signal sensed or measured by the first device.

12. The method for selecting the resource according to claim 11, wherein the first sidelink resource pool is one or more sidelink resource pools in the plurality of sidelink resource pools.

13. The method for selecting the resource according to claim 12, wherein the second sidelink resource pool is one or more sidelink resource pools in the plurality of sidelink resource pools;
wherein the first sidelink resource pool is determined by using at least one of the following modes:
determining the first sidelink resource pool based on configuration information or pre-configuration;
determining the first sidelink resource pool based on a set rule;
determining the first sidelink resource pool based on a channel sensing result or a signal measurement result;
determining the first sidelink resource pool based on a time and frequency resource triggering the second device to transmit the first sidelink control signaling.

14. The method for selecting the resource according to claim 13, wherein the second sidelink resource pool is determined by using at least one of the following modes:
determining the second sidelink resource pool based on configuration information or pre-configuration;
determining the second sidelink resource pool according to a time and frequency resource used for transmission of the first sidelink control signaling;
determining the second sidelink resource pool according to a channel sensing result or a signal measurement result;
determining the second sidelink resource pool based on a time and frequency resource triggering the second device to transmit the first sidelink control signaling.

15. The method for selecting the resource according to claim 11, wherein the first sidelink control signaling carries a first indication of the second sidelink resource pool.

16. The method for selecting the resource according to claim 11, further comprising:
receiving second sidelink control signaling transmitted from the first device.

17. The method for selecting the resource according to claim 16, wherein the second sidelink control signaling carries a second indication of at least one of the first sidelink resource pool or the second sidelink resource pool; and
the method for selecting the resource further comprises:
determining at least one of the first sidelink resource pool or the second sidelink resource pool, based on the second indication.

18. The method for selecting the resource according to claim 16, wherein the second sidelink control signaling carries a third indication of a third sidelink resource pool, and the third sidelink resource pool is a sidelink resource pool to which a sidelink transmission resource selected by the first device belongs; and
the method for selecting the resource further comprises:
determining at least one of the first sidelink resource pool or the second sidelink resource pool, based on the third indication of the third sidelink resource pool.

19. The method for selecting the resource according to claim 11, wherein the plurality of sidelink resource pools configured or pre-configured for the second device are resource pools configured on the same bandwidth part (BWP) or carrier frequency, or resource pools configured on different BWPs or carrier frequencies.

20. An apparatus for selecting a resource, comprising:
a processor; and
a memory configured to store processor-executable instructions, wherein
the processor-executable instructions, when executed by the processor, cause the processor to:
receive first sidelink control signaling transmitted from a second device by using a first sidelink resource pool, wherein the first sidelink control signaling comprises an indication of an auxiliary time and frequency resource set, and the auxiliary time and frequency resource set belongs to a second sidelink resource pool and is configured to assist the first device in selecting a resource; and
select a sidelink transmission resource from a third sidelink resource pool based on the auxiliary time and frequency resource set;
wherein the first device is configured or pre-configured with a plurality of sidelink resource pools, and the third sidelink resource pool is one or more sidelink resource pools in the plurality of sidelink resource pools;
wherein the third sidelink resource pool comprises a time and frequency resource triggering the second device to transmit the first sidelink control signaling, and
the time and frequency resource triggering the second device to transmit the first sidelink control signaling comprises at least one of:
a time and frequency resource used by second sidelink control signaling transmitted from the first device, wherein the second sidelink control signaling is configured to trigger the second device to transmit the first sidelink control signaling;
a time and frequency resource used by a sidelink channel sensed or measured by the first device; or
a time and frequency resource used by a sidelink signal sensed or measured by the first device.

* * * * *